United States Patent
Wrighton et al.

(10) Patent No.: US 11,429,358 B2
(45) Date of Patent: Aug. 30, 2022

(54) REPRESENTING ASYNCHRONOUS STATE MACHINE IN INTERMEDIATE CODE

(71) Applicant: Microsoft Technology Licensing, LLC, Redmond, WA (US)

(72) Inventors: David Charles Wrighton, Redmond, WA (US); Jan Kotas, Redmond, WA (US); Stephen Harris Toub, Winchester, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/991,892

(22) Filed: Aug. 12, 2020

(65) Prior Publication Data
US 2022/0050669 A1 Feb. 17, 2022

(51) Int. Cl.
*G06F 9/45* (2006.01)
*G06F 8/41* (2018.01)
*G06F 9/448* (2018.01)

(52) U.S. Cl.
CPC .............. *G06F 8/443* (2013.01); *G06F 8/427* (2013.01); *G06F 9/4498* (2018.02)

(58) Field of Classification Search
CPC ......... G06F 8/443; G06F 8/427; G06F 9/4498
USPC ........................................................ 717/151
See application file for complete search history.

(56) References Cited

U.S. PATENT DOCUMENTS

| | | | |
|---|---|---|---|
| 5,960,200 A * | 9/1999 | Eager ..................... | G06F 8/427 709/201 |
| 6,985,846 B1 * | 1/2006 | Dunlavey .............. | G16H 10/20 703/22 |
| 8,347,272 B2 | 1/2013 | Sugawara et al. | |
| 8,490,115 B2 | 7/2013 | Torgersen et al. | |
| 9,092,564 B2 | 7/2015 | Wischik et al. | |
| 10,733,010 B2 | 8/2020 | Kasha et al. | |
| 2002/0166000 A1 | 11/2002 | Rossi et al. | |
| 2003/0056205 A1 | 3/2003 | Miloushev et al. | |
| 2003/0135850 A1 | 7/2003 | Miloushev et al. | |
| 2005/0086650 A1 | 4/2005 | Yates et al. | |
| 2005/0246692 A1 * | 11/2005 | Poteryakhin ............ | G06F 8/458 717/140 |
| 2006/0059496 A1 * | 3/2006 | Joy ...................... | G06F 11/3636 719/310 |
| 2011/0258594 A1 * | 10/2011 | Syme ...................... | G06F 8/445 717/106 |

(Continued)

OTHER PUBLICATIONS

Formal behavior specification of multi-robot systems using hierarchical state machines in XABSL, author: M Risler et al, published on 2008.*

(Continued)

*Primary Examiner* — Chameli Das
(74) *Attorney, Agent, or Firm* — Workman Nydegger

(57) ABSTRACT

Representing asynchronous functionality in intermediate code, and then having the runtime compiler, rather than the source code language compiler, declare the corresponding asynchronous state machine. This allows the size of the intermediate code to be smaller thereby facilitating more efficient delivery of the code to end users. Furthermore, the runtime compiler can now use its optimization capability to optimize performance of the asynchronous functionality specific to the actual environment in which the asynchronous work will operate.

17 Claims, 5 Drawing Sheets

(56) References Cited

U.S. PATENT DOCUMENTS

| | | | | |
|---|---|---|---|---|
| 2012/0246624 | A1* | 9/2012 | Halliday | G06F 11/362 |
| | | | | 717/129 |
| 2013/0055223 | A1* | 2/2013 | Xu | G06F 8/427 |
| | | | | 717/143 |
| 2013/0074092 | A1* | 3/2013 | Gounares | G06F 9/44557 |
| | | | | 718/104 |
| 2013/0104148 | A1 | 4/2013 | Torgersen et al. | |
| 2016/0094636 | A1* | 3/2016 | Carr | H04L 67/02 |
| | | | | 709/226 |
| 2016/0110170 | A1* | 4/2016 | Miller | G06F 8/4443 |
| | | | | 717/151 |
| 2019/0187965 | A1* | 6/2019 | Toub | G06F 8/4441 |
| 2019/0265956 | A1 | 8/2019 | Toub et al. | |
| 2020/0125364 | A1 | 4/2020 | Österlund | |
| 2020/0210156 | A1* | 7/2020 | Toub | G06F 8/443 |
| 2021/0336622 | A1* | 10/2021 | Young | H03K 19/17736 |
| 2022/0066759 | A1 | 3/2022 | Wrighton et al. | |

OTHER PUBLICATIONS

Model checking and code generation for UML state machines and collaborations, author: A Knapp et al, published on 2002.*

Title: The F# asynchronous programming model author: D Syme, et al, published on 2011.*

Title: Checking sequence generation for asynchronous sequential elements, author: S Goren et al, published on 1999.*

Title: TeSSLa: runtime verification of non-synchronized real-time streams, author: M Leucker, published on 2018.*

Title: A parallel dynamic compiler for CIL bytecode, author: S Campanoni, published on 2008.*

"Non Final Office Action Issued in U.S. Appl. No. 17/002,579", dated Sep. 16, 2021, 7 Pages.

Kahlon, et al., "Static Data Race Detection for Concurrent Programs with Asynchronous Calls", In Proceedings of the 7th Joint Meeting of the European Software Engineering Conference and the ACM SIGSOFT Symposium on The Foundations of Software Engineering, Aug. 24, 2009, pp. 13-22.

"International Search Report and Written Opinion Issued in PCT Application No. PCT/US21/029769", dated Aug. 18, 2021, 13 Pages.

Severini, Paolo, "Async-Await in C++", Retrieved from: https://paoloseverini.wordpress.com/2014/04/22/async-await-in-c/, Apr. 22, 2014, 16 Pages.

Tepliakov, Sergey, "Dissecting the Async Methods in C#", Retrieved from: https://devblogs.microsoft.com/premier-developer/dissecting-the-async-methods-in-c/, Nov. 30, 2017, 11 Pages.

"International Search Report and Written Opinion Issued in PCT Application No. PCT/US2021/030992", dated Aug. 19, 2021, 14 Pages.

Wagner, et al., "Await Operator—C# Reference", Retrieved From: https://web.archive.org/web/20200720224108/https://docs.microsoft.com/en-US/dotnet/csharp/language-reference/operators/await, Jul. 13, 2020, 4 Pages.

Wagner, et al., "Task Asynchronous Programming Model", Retrieved From: https://web.archive.org/web/20200828122319/https://docs.microsoft.com/en-US/dotnet/csharp/programming-guide/concepts/async/task-asynchronous-programming-model, Aug. 19, 2020, 11 Pages.

"Notice of Allowance Issued in U.S. Appl. No. 17/002,579", dated Apr. 27, 2022, 6 Pages.

* cited by examiner

REPRESENTING ASYNCHRONOUS STATE MACHINE IN INTERMEDIATE CODE

BACKGROUND

Source code is text that describes functionality and data structures using a set of semantic and syntactic rules that are often called a "source code language". Source code can be compiled into binary instructions (sometimes called "machine code") that can be directly executed by a computing system. Examples of source code languages include Java, C #, Pascal, Python, JavaScript, amongst many others.

Sometimes source code is compiled directly into machine code. However, in order to offer software that can be optimized for a variety of different environments, compilation often now occurs in two stages. In a first stage, a language specific compiler (e.g., a C # or Java compiler) compiles source code conforming to the corresponding source code language (e.g., C #) into an intermediate environment-independent code.

This intermediate code still describes the behavior of the original source code, but is not specific to any particular environment. Thus, the intermediate code cannot be directly executed by a CPU. Later, in a specific environment, a runtime compiler compiles the intermediate code into machine code in a manner that is tailored towards the runtime environment. The binary represents the functionality described in the intermediate language with perhaps some optimization being performed in order to improve the performance of the program as executed in the specific environment.

One type of programming is asynchronous programming in which code can be represented in a sequential order, but the code executes in an asynchronous fashion. That is, at runtime, a unit of work may be paused temporarily while waiting for an event to occur (e.g., receipt of a network I/O message), whereupon the unit of work is resumed in the same state as when the work was paused.

Asynchronous program is conventionally represented in the source code language. That is, the source code defines the asynchronous work, and the source code compiler creates an asynchronous state machine as well as additional bookkeeping functionality. The runtime executes the intermediate code synchronously but causes the system to behave asynchronously due to the presence of the state machine and other functions declared by compilation of the source code. The runtime compiler may not even be aware that it is compiling asynchronous functionality at all.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to representing asynchronous functionality in intermediate code, and then having the runtime compiler, rather than the source code language compiler, declare the corresponding asynchronous state machine. This allows the size of the intermediate code to be smaller thereby facilitating more efficient delivery of the code to end users. Furthermore, the runtime compiler can now use its optimization capability to optimize performance of the asynchronous functionality specific to the actual environment in which the asynchronous work will operate.

When the language compiler compiles the source code into intermediate code, the source code parses the source code that conforms with the language of the language compiler. In so doing, the language compiler detects a source code representation of an asynchronous function. In response, the language compiler generates an intermediate language representation of an asynchronous state machine that corresponds to the asynchronous function. Later, the runtime compiler interprets the intermediate language representation as an instruction to declare an asynchronous state machine within a memory of a runtime environment. The runtime environment executes the asynchronous function using that state machine.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to representing asynchronous functionality in intermediate code, and then having the runtime compiler, rather than the source code language compiler, declare the corresponding asynchronous state machine. This allows the size of the intermediate code to be smaller thereby facilitating more efficient delivery of the code to end users. Furthermore, the runtime compiler can now use its optimization capability to optimize performance of the asynchronous functionality specific to the actual environment in which the asynchronous work will operate.

When the language compiler compiles the source code into intermediate code, the source code parses the source code that conforms with the language of the language compiler. In so doing, the language compiler detects a source code representation of an asynchronous function. In response, the language compiler generates an intermediate language representation of an asynchronous state machine that corresponds to the asynchronous function. Later, the runtime compiler interprets the intermediate language representation as an instruction to declare an asynchronous state machine within a memory of a runtime environment. The runtime environment executes the asynchronous function using that state machine.

Because the principles described herein are performed in the context of a computing system, some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
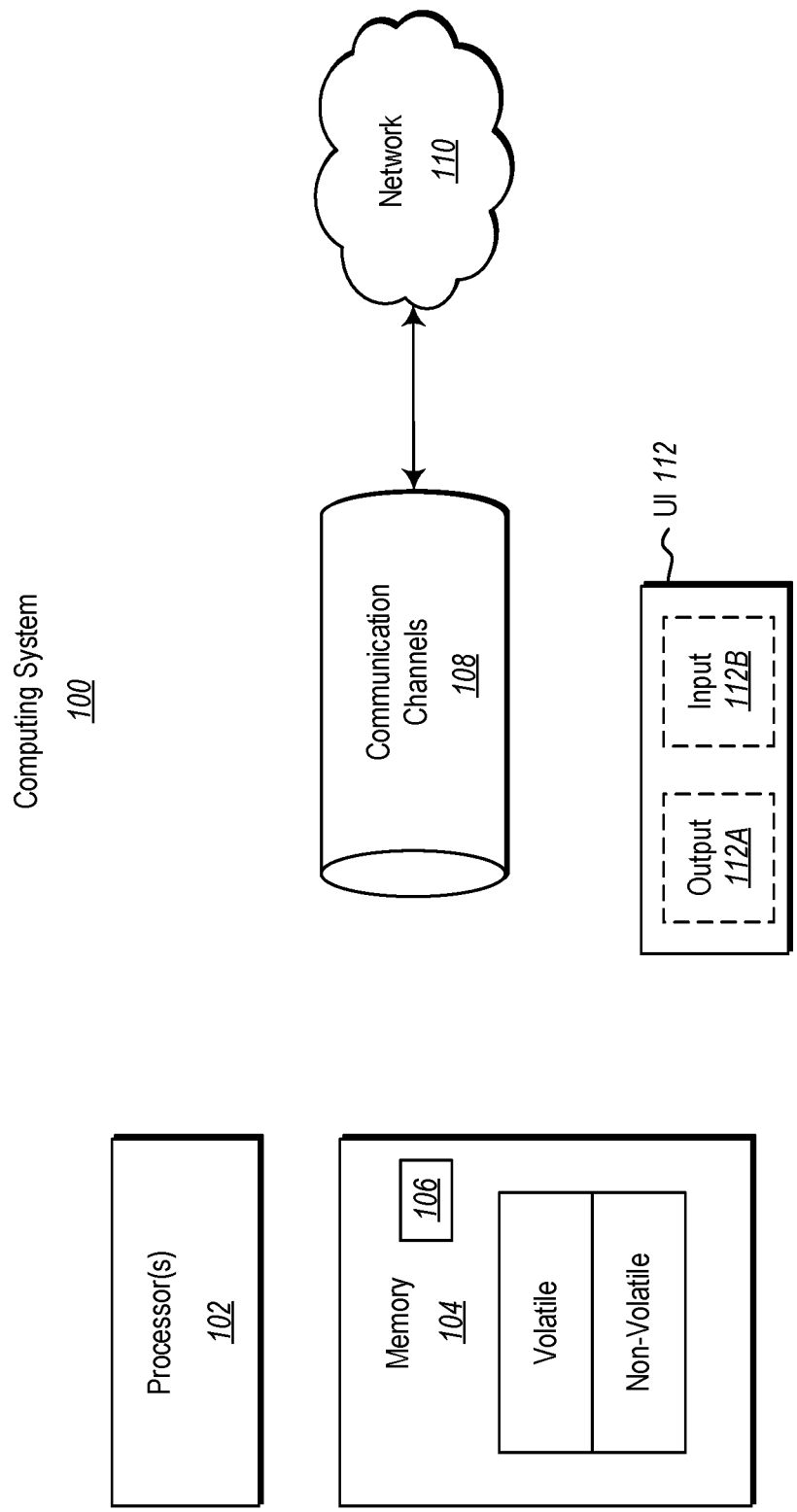
FIG. 1 illustrates an example computing system in which the principles described herein may be employed.

As illustrated in FIG. 1, in its most basic configuration, a computing system 100 includes at least one hardware processing unit 102 and memory 104. The processing unit 102 includes a general-purpose processor. Although not required, the processing unit 102 may also include a field programmable gate array (FPGA), an application specific integrated circuit (ASIC), or any other specialized circuit. In one embodiment, the memory 104 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Figure 2:
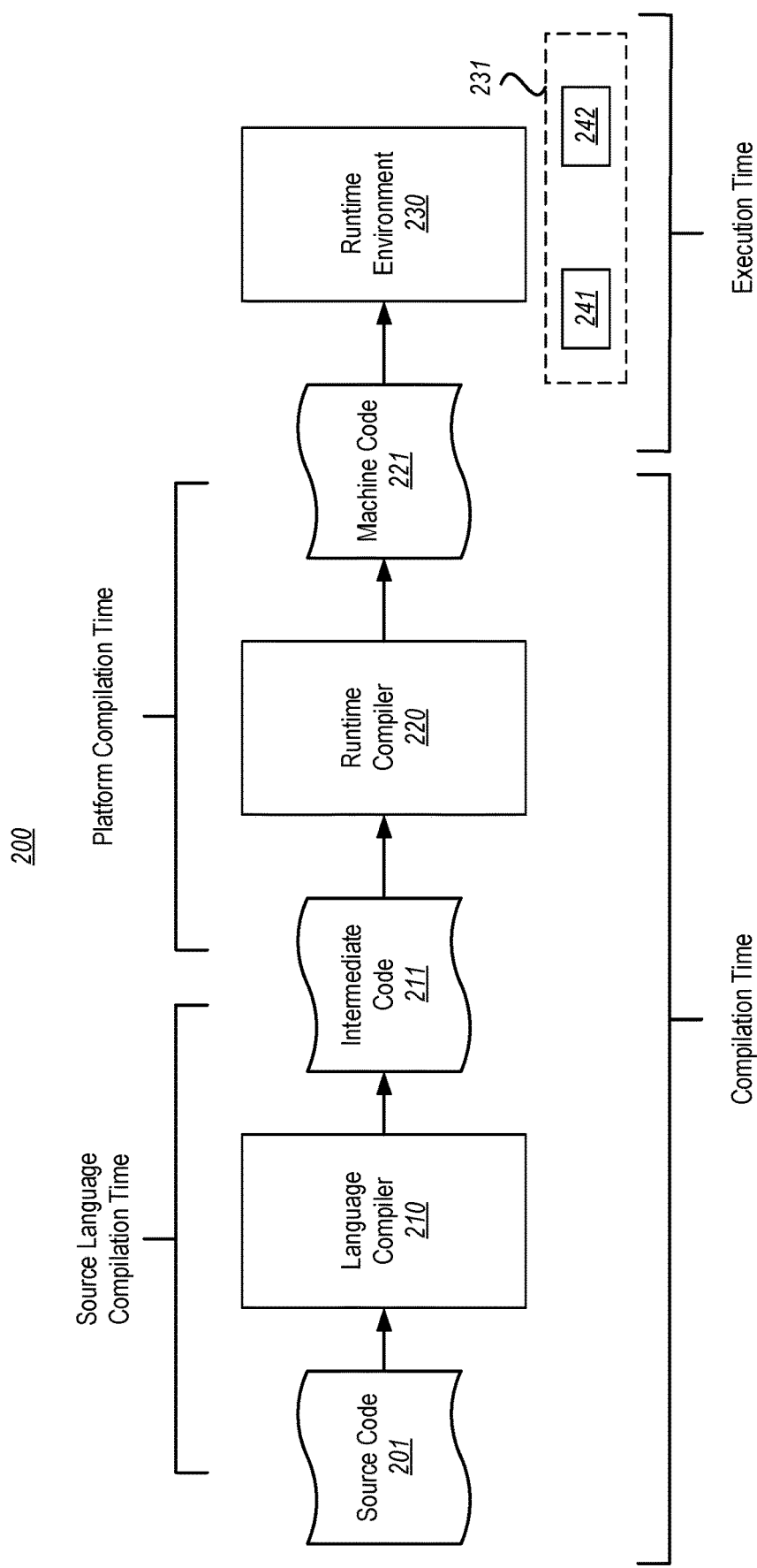
FIG. 2 illustrates a process flow associated with an example compilation and execution of software, including the compilation of intermediate code from source code, the compilation of machine code from that intermediate code, and the execution of that machine code in a runtime environment.

FIG. 2 illustrates a process flow 200 associated with an example compilation and execution of software. In the case of the process flow 200, compilation occurs in two distinct stages at two distinct times. Namely, compilation occurs first in a source language compilation stage at a source language compilation time, and thereafter compilation occurs in a platform compilation stage at a platform compilation time. In the example process flow 200 of FIG. 2, at source language compilation time, a language compiler 210 compiles source code 210 into intermediate code 211. At platform compilation time, a runtime compiler 220 compiles the intermediate code 211 into machine code 221.

After compilation, at execution time, the compiled code is executed by a runtime environment. As depicted in FIG. 2, at execution time, the runtime environment 230 executes the machine code 221 to accomplish within the runtime environment 230 the functionality original described in the source code 201. Each of the language compiler 210, the runtime compiler 220 and the runtime environment 230 may be structured as described above for the computing system 100 of FIG. 1. The runtime environment 230 may also include components 231 that are used to assist the runtime environment 230 in running asynchronous functions. As an example, the components 231 include components 241 and 242, an example of which will be described further below. If the runtime compiler 220 is a Just-in-Time (JIT) compiler, then runtime compilation occurs in preparation for immediate execution of the resulting machine code. However, the runtime compiler 220 may alternatively be an Ahead-of-Time compiler, in which case the resulting machine code can be executed well after platform compilation time.

The source code 201 is authored in a source code language and thus conforms to semantic rules defined by the source code language 201. Examples of source code languages include Java, C #, Pascal, Python, JavaScript, amongst many others. In general, source code language uses textual structures and semantic rules that are more intuitive to a human programmer to express software functionality. The language compiler 210 is configured to compile source code of a particular source code language. As examples, there are Java compilers, C # compilers, Pascal compilers, Python compilers, Javascript compilers, and compilers for all other source code languages. The language compiler 210 is considered a front-end compiler and may perform lexical, syntactic and semantic analysis to generate the intermediate code 211.

The intermediate code 211 is code format that can be executed across a broad spectrum of different platforms after compilation by an appropriate runtime compiler. That is, the runtime compiler for a particular platform will take into consideration that platform-specific runtime environment, and compile the intermediate code 211 into machine code that is targeted to, and optimized for, the corresponding platform. The intermediate code 211 may also be independent of the source code language that it was compiled from. However, intermediate code can be either source code language specific or source code language independent.

Examples of intermediate code include Byte Code which is specific to Java. There is also three-address code, which is source language independent. As another example, there is an intermediate language called "Common Intermediate Language" (or CIL) that is designed for runtime compilers used by the .NET framework. There can be different levels of intermediate language code—such as high level intermediate code which is closer to the source code, and low level intermediate code which is close to the machine code, and all levels in between. The principles described herein are not limited to a particular type of intermediate language, or whether such intermediate languages now exist or are to be developed in the future.

The use of intermediate code is helpful as it keeps the analysis portion of the compiler the same regardless of the nature of the platform in which the intermediate code will execute. Thus, a full compiler is not required for each unique system in which the code will operate. The runtime compiler can thus focus on optimization to a particular environment. In practice, source language compilation time often occurs prior to delivery of software for execution in a particular platform, whereas platform compilation time occurs after delivery of the software, once the characteristics of the platform in which the software will execute is known. In some embodiments, platform compilation time occurs at the same time as execution time in a just-in-time model. In other embodiments, platform compilation time can occur well in advance of the execution of the software within the runtime environment.

Figure 3:
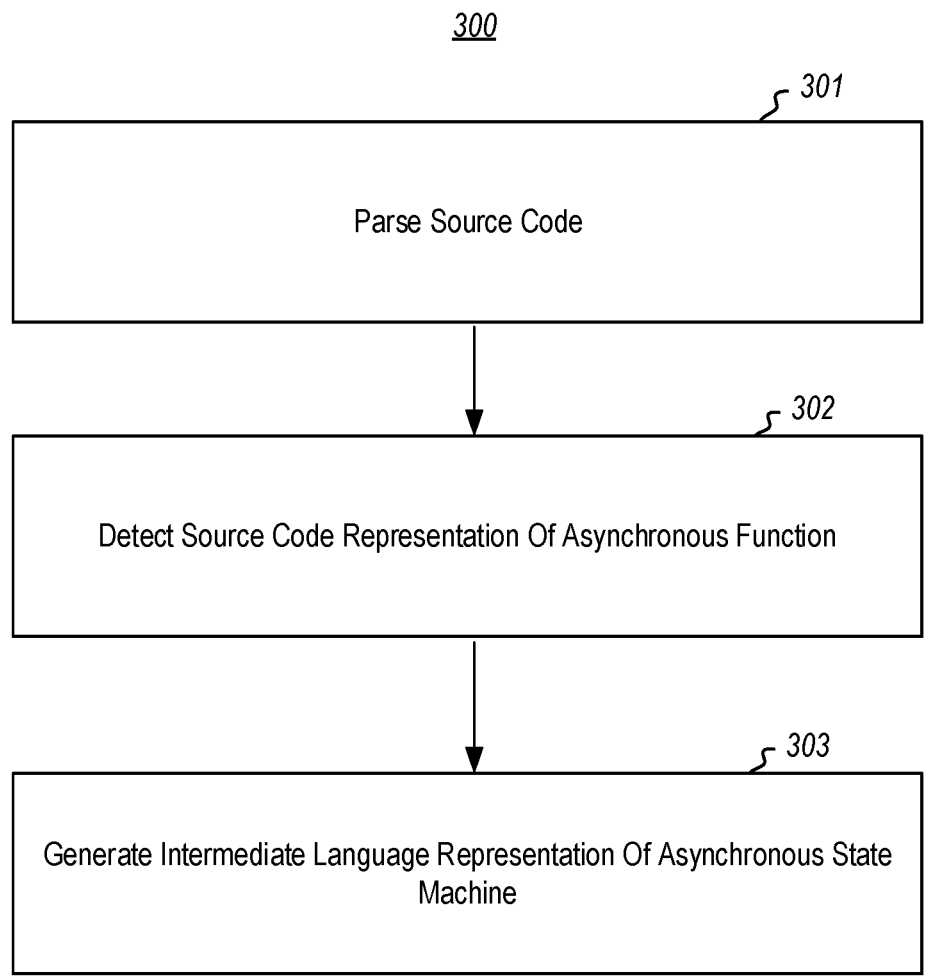
FIG. 3 illustrates a flowchart of a method for a language compiler to compile source code into intermediate code, in accordance with the principles described herein.

FIG. 3 illustrates a flowchart of a method 300 for a language compiler to compile source code into intermediate code, in accordance with the principles described herein. The method 300 may be performed by the language compiler 210 of FIG. 2. As an example, if the language compiler 210 is structured as described above for the computing system 100 of FIG. 1, there are computer-executable instructions stored in the memory 104 of the computing system 100 such that, if the computer-executable instructions are executed by the one or more processing units 102, the computing system 100 performs the method 300.

The method 300 includes parsing source code that conforms with a language of the language compiler (act 301). Referring to FIG. 2 as an example, the language compiler 210 parses the source code 201 using lexicological, syntactic and semantic rules of the source code language corresponding to the language compiler 210. This allows the language compiler to build an abstract syntax tree of the source code 201.

Figure 4:
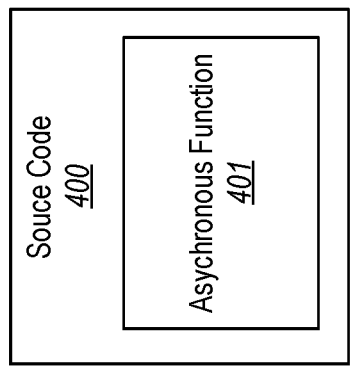
FIG. 4 schematically illustrates source code, which includes a source code representation of an asynchronous function.

In this process, suppose that the language compiler detects a source code representation of an asynchronous function that was represented within the source code (act 302). FIG. 4 schematically illustrates source code 400, which includes a source code representation of an asynchronous function 401. An "asynchronous function" is any function, method, object, or component that can be paused at one or more execution points, and then resume upon the occurrence of a specified event. The following is an example of source code drafted in C # that includes an asynchronous function called "DoStuff", and which has line numbering added for clarity and for future reference.

1. async Task<int> DoStuff(ObjectThatHasAsync oasync)
2. {
3. DateTime date=await oasync.DoOtherStuff( );
4. string str=await oasync.DateToString(date)
5. return Int32.Parse(str);
6. }

This example will be referred to as the "DoStuff" example herein. As shown in line 1, the DoStuff function receives an object called "oasync" which is of type "ObjectThatHasAsync", which is an object type that includes one or more asynchronous methods. The "DoStuff" function operates as described between the opening bracket on line 2 and the closing bracket on line 6. Specifically, the object includes a method called "DoOtherStuff" as well as a method called "DateToString", any one of which perhaps having to pause at some point waiting for an event to occur.

As shown in line 3, "DateTime date=await oasync.DoOtherStuff( );", which declares a parameter called "date" and being of type "DateTime". The term "await" identifies the method DoOtherStuff as being capable of returning either synchronously or asynchronously. Here, returning asynchronously means that the method was able to perform all of its processing and return an actual value (in this case "date" of type DateTime). Returning asynchronous means that the method paused and returned without a complete value, and can resume upon the occurrence of an event. As shown in line 4, "string str=await oasync.DateToString (date)" declares a parameter called "str" of type string. The term "await" identifies the method DateToString as also being capable of returning either synchronously or asynchronously. As shown in line 5, "return Int32.Parse(str);" causes the DoStuff method to return in Int32 representation of the value str of type string.

Figure 5:
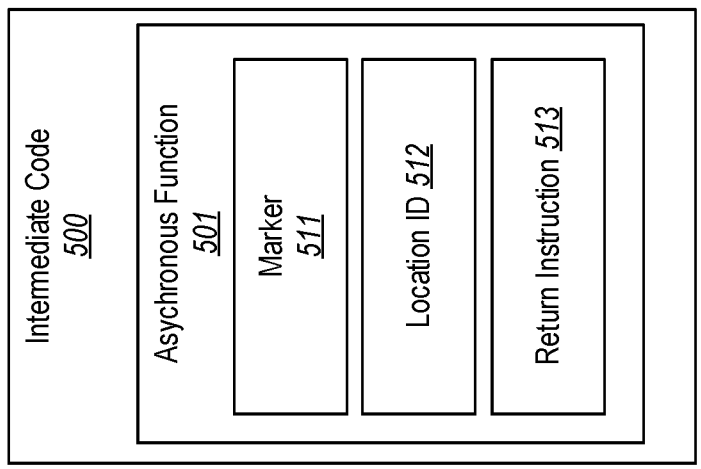
FIG. 5 illustrates an example of intermediate code that includes a runtime representation of the asynchronous state machine, in accordance with the principles described herein.

Returning to FIG. 3, in response to detecting that the source code includes a source code representation of an asynchronous function (act 302), the language compiler generates an intermediate language representation of an asynchronous state machine that corresponds to the asynchronous function (act 303). This declaration is structured to be interpreted by a runtime compiler as an instruction to declare an asynchronous state machine. FIG. 5 illustrates an example of an intermediate code 500 that includes an intermediate code representation 501 of the asynchronous state machine that describes the same functionality as the source code representation 401 of the asynchronous state machine.

Conventionally, generation of asynchronous methods requires the C # compiler to create complex state machines within the intermediate code. This causes the size of the intermediate code to be larger, and since the intermediate code is typically what is delivered to the user, the size of the deliverable is larger. This causes a number of problems including more bandwidth required to deliver the intermediate code to the user, and longer download times. In addition, because the runtime compiler itself does not have visibility that this complex state machine represents an asynchronous function, the runtime compiler cannot use the knowledge that it is dealing with an asynchronous function to optimize performance of the asynchronous function.

Instead, in FIG. 5, the intermediate code 500 includes an intermediate code representation of the asynchronous function 501. The intermediate code 500 is an example of the intermediate code 211 of FIG. 2. Thus, the asynchronous function is visible to the runtime compiler (e.g., runtime compiler 220), and thus the runtime compiler can optimize performance of the asynchronous function. Furthermore, the intermediate code representation 501 of the asynchronous function is smaller than the more complex state machines previously used by the source language compiler to keep track of asynchronous functionality. Accordingly, the size of the intermediate code may be made smaller.

The intermediate code representation 501 of the asynchronous function includes three data structures 511, 512 and 513, which will now be described. The data structure 511 is a marker 511 that is structured to be interpretable by the runtime compiler as indicating that the asynchronous function can return asynchronously. Stated differently, the marker 511 is interpretable by the runtime compiler as an instruction to make available to a runtime of the asynchronous function one or more components that assist the asynchronous function to return asynchronously. Referring to FIG. 2, the components 231 may be made available to the runtime environment 230 in response to a marker 511 being present within the intermediate code representation 501 of the asynchronous function.

The data structure 512 is a location identifier 512 interpretable by the runtime compiler as identifying one or more portions at which the asynchronous function can pause. There may a location identifier 512 for each location at which the asynchronous function can pause. The data structure 513 is an instruction 513 that is structured to be interpretable by the runtime environment 530 as instructing how to return from the asynchronous function.

Returning to the DoStuff example, the source code for the DoStuff function could be compiled into the following intermediate code representation (with line numbers added for clarity and ease of reference).

1. [System.Runtime.CompilerServices.RuntimeGeneratedAsyncStateMachineAttribute]
2. Task<int>DoStuff(ObjectThatHasAsync oasync)
3. .locals
4. (DateTime, string)
5. {
6. ldarg.1
7. callvirt instance Task<DateTime> ObjectThatHasAsync.DoOtherStuff( )
  //Call to method that returns task.
8. call !!0 RuntimeHelpers.Await<DateTime>(Task<!!0>)
  //Await intrinsic, that will convert this method into a state machine if necessary.
9. stloc.0
10. ldarg.1
11. ldloc.0
12. callvirt instance Task<string> ObjectThatHasAsync.DateToString(DateTime)
  //Call to method that returns task.
13. call !!0 RuntimeHelpers.Await<string>(Task<!!0>)
  //Await intrinsic, that will convert this method into a state machine if necessary.
14. stloc.1
15. ldloc.1
16. call int32 System.Int32.Parse(string)
17. call Task<!!0> RuntimeHelpers.RuntimeGeneratedTaskTReturn<int>( )
18. ret
19. }

Line 1 is an example of marker 511 of FIG. 5, and is an intermediate code representation of an instruction to the runtime compiler to make available to the runtime components that can be used to perform the asynchronous function at runtime. For example, line 1 will cause components to be available that are used by the runtime to generate an asynchronous state machine. Such components include a pause component called "RuntimeHelpers.Await", which is later invoked in lines 8 and 13, and are each examples of the location identification 512 in FIG. 5. Such components also include a return component called "RuntimeHelpers.RuntimeGeneratedTaskTReturn", which is later invoked in line 17, which is an example of the return instruction 513 of FIG. 5. Referring to FIG. 2, the function 241 represents a pause component that instructs the runtime 230 on where the asynchronous function represented in the machine code 221 can pause. The function 242 represents a return component that instructs the runtime 230 on how to return from an asynchronous function "Task<int> DoStuff(ObjectThatHasAsync oasync)".

Line 2 identifies that source code function that the intermediate code corresponds to. In this case, the intermediate code is an intermediate code representation of the source code". Lines 3 and 4 declare the local variables of type DateTime and String. The opening bracket on line 5 and the closing bracket on line 19 and define the extend of the intermediate code that defines the function identified in line 2. Lines 6 to 9 of the intermediate code is the intermediate code representation of the source code from line 3 of the source code. Lines 10 to 14 of the intermediate code is the intermediate code representation of the source code from line 4 of the source code. Lines 15 to 18 of the intermediate code is the intermediate code representation of the source code from line 5 of the source code. This patent application will hereinafter refer to this intermediate code of the DoStuff example.

Figure 6:
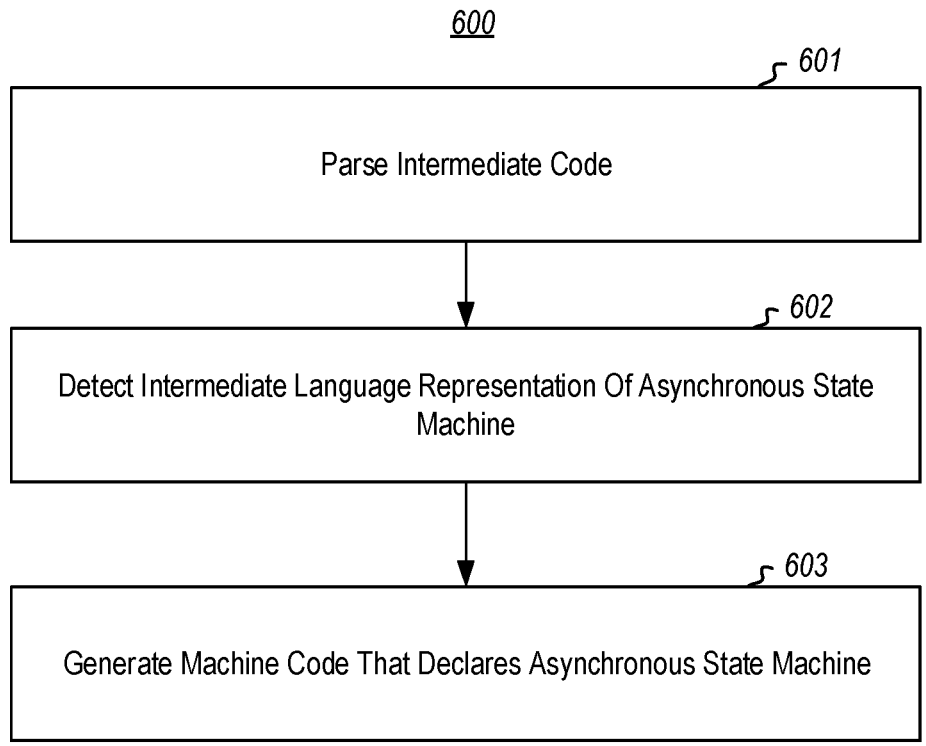
FIG. 6 illustrates a flowchart of a method for compiling intermediate code into binary code that is executable by a runtime, in accordance with the principles described herein.

FIG. 6 illustrates a flowchart of a method 600 for compiling intermediate code into binary code that is executable by a runtime environment, in accordance with the principles described herein. The method 600 may be performed by the runtime compiler 220 of FIG. 2. As an example, if the runtime compiler 220 is structured as described above for the computing system 100 of FIG. 1, there are computer-executable instructions stored in the memory 104 of the computing system 100 such that, if the computer-executable instructions are executed by the one or more processing units 102, the computing system 100 performs the method 600.

The method 600 includes parsing intermediate code that is structured to be interpreted by a runtime compiler (act 601). As an example, the runtime compiler may be the runtime compiler 220 of FIG. 2, which may be part of the runtime environment 230 of a computing system. While parsing the intermediate language code (ac 601), the runtime compiling detects an intermediate language representation of an asynchronous state machine from the parsed intermediate code (act 602). For instance, when parsing the intermediate code of the DoStuff example, there are two times that the runtime compiler would detect, once at line 7 when encountering "Task<DateTime> ObjectThatHasAsync.DoOtherStuff( )" and once at line 10 when encountering "Task<string> ObjectThatHasAsync.DateToString(DateTime)". The runtime compiler then generates machine language code that, when executed by the runtime environment, formulates an asynchronous state machine in the memory of the computing system (act 603).

Figure 7:
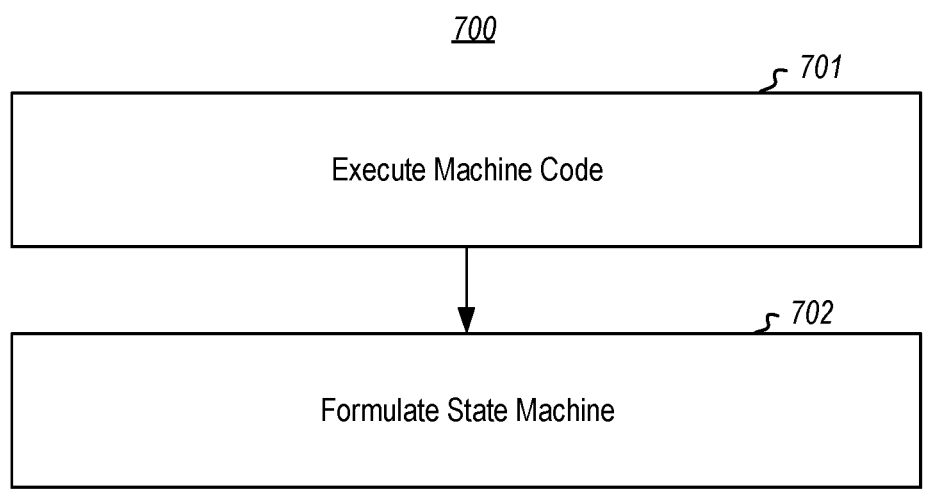
FIG. 7 illustrates a flowchart of a method for executing the asynchronous function by executing machine language code, in accordance with the principles described herein.

FIG. 7 illustrates a flowchart of a method 700 for executing the asynchronous function by executing machine language code, in accordance with the principles described herein. Here, the method 700 may be performed by the runtime environment 230 of FIG. 2. As an example, if the runtime environment 230 is structured as described above for the computing system 100 of FIG. 1, there are computer-executable instructions stored in the memory 104 of the computing system 100 such that, if the computer-executable instructions are executed by the one or more processing units 102, the computing system 100 performs the method 700. If the runtime compiler is a Just-in-Time compiler, then the method 700 would be performed right after the machine code is generated in the method 600 of FIG. 6. However, in Ahead-of-Time compilation, the machine code may not be executed for some time.

In accordance with the method 700, the runtime environment executes a binary representation of the intermediate code. For example, referring to FIG. 2, the runtime environment 230 executes the machine code 221 (act 701). Because the machine code is structured to cause the runtime environment to formulate a state machine representation of the asynchronous function (e.g., in act 603 of method 600), the execution of the machine code (act 701) causes the runtime environment to formulate the state machine. More details about how this could be accomplished will now be described with respect to the intermediate code of the DoStuff example.

Upon executing the machine code that the runtime compiler compiled from line 1 of the intermediate code, the runtime environment imports the functions that are within the System.Runtime.CompilerServices library corresponding to the .RuntimeGeneratedAsyncStateMachineAttribute attribute. These include at least the functions identified as "RuntimeHelpers.Await" and "RuntimeHelpers.RuntimeGeneratedTaskTReturn".

Upon executing the machine code compiled from line 7 "Task<DateTime> ObjectThatHasAsync.DoOtherStuff( )" of the intermediate code, the runtime environment will cause the DoOtherStuff method to be called, and such will return with a task that is called in the intermediate code "Task<DateTime>". Upon executing the machine code compiled from line 8 "RuntimeHelpers.Await<DateTime>(Task<!!0>)", the runtime environment determines whether the method has returned a completed value (e.g., an actual DateTime value), and if it has, it allows execution to proceed. However, if the runtime determines that the method has returned to await an event, the execution of the binary corresponding to line 8 causes the DoStuff function to pause, constructs a state machine that will allow the DoStuff function to resume upon the occurrence of a specified event, causes the DoStuff function to return with the state machine, and schedules the DoStuff function to resume (by causing the state machine to continue) upon the occurrence of the event. As part of the construction of the state machine, state may be saved to the runtime environment that may later be loaded in order to resume operation of the DoStuff method at the point at which it was paused.

Similarly, upon executing the machine code compiled from line 12 "Task<string> ObjectThatHasAsync.DateToString(DateTime)" of the intermediate code, the runtime environment will cause the DateToString method to be called with a completed value from the DoOtherStuff method (which is the DateTime value). Upon executing the machine code compiled from line 12 "RuntimeHelpers.Await<string>(Task<!!0>)", the runtime environment determines whether the method has returned a completed value (e.g., an actual String value), and if it has, it allows execution to proceed (e.g., to return from the method DoStuff in line 18). However, if the runtime environment determines that the method has returned to await an event, the execution of the binary corresponding to line 12 causes the DoStuff function to pause, constructs a state machine that will allow the DoStuff function to resume upon the occurrence of a specified event, causes the DoStuff function to return with the state machine, and schedules the DoStuff function to resume (by causing the state machine to continue) upon the occurrence of the event.

However, suppose the execution of line 8 of the intermediate code has already caused a state machine to be constructed because the DoOtherStuff method also returned asynchronously. In that case, there would be no need to reconstruct the state machine. Instead, the state of the DoStuff method would be recorded back into the previously constructed state machine. Accordingly, the runtime environment would then record the state and just schedule the resumption of DoStuff method to occur upon the occurrence of the event.

The principles described herein relate to representing asynchronous functionality in intermediate code, and then having the runtime compiler, rather than the source code language compiler, declare the corresponding asynchronous state machine. This allows the size of the intermediate code to be smaller thereby facilitating more efficient delivery of the code to end users. Furthermore, the runtime compiler can now use its optimization capability to optimize performance of the asynchronous functionality specific to the actual environment in which the asynchronous work will operate.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A method for a source code language compiler to compile source code into an intermediate code, the method comprising:
    a source code language compiler parsing source code that conforms with a language of the source code language compiler;
    detecting a source code representation of an asynchronous function; and
    in response to the detection, the source code language compiler generating an intermediate language representation of an asynchronous state machine that corresponds to the asynchronous function, the intermediate language representation not being executable native code but being structured to be further interpretable by a runtime compiler as an instruction to generate an asynchronous state machine in native code that is executable within a runtime environment;
    wherein the intermediate language representation includes a marker that is structured to be interpretable by the runtime compiler as indicating that the asynchronous function can return asynchronously, an identification interpretable by the runtime compiler as identifying one or more portions at which the asynchronous function can pause, and an instruction that is structured to be interpretable by the runtime environment as instructing how to return from the asynchronous function.

2. The method in accordance with claim 1, the intermediate language representation including a marker that is structured to be interpretable by the runtime compiler as indicating that the asynchronous function can return asynchronously.

3. The method in accordance with claim 1, the intermediate language representation including an instruction that, when interpreted by the runtime compiler, causes that runtime compiler to make available to a runtime of the asynchronous function one or more components that assist the asynchronous function to return asynchronously.

4. A computing system for compiling intermediate code into binary code that is executable by a runtime environment of the computing system, the computing system comprising:
    one or more processors; and
    one or more computer-readable media having thereon computer-executable instructions that, if executed by the one or more processors the computing system is configured to:
    parse intermediate code that is structured to be interpreted by a runtime compiler of the computing system;
    detect an intermediate language representation of an asynchronous state machine from the parsed intermediate code, the intermediate language representation not being executable native code and not directly executable within the computing system; and
    in response to the detection, the runtime compiler interpreting the intermediate language representation and generating machine language code that generates an asynchronous state machine in the memory of the computing system, the machine language code being directly executable by the computing system within a runtime environment;
    wherein the intermediate language representation includes a marker that is structured to be interpretable by the runtime compiler as indicating that the asynchronous function can return asynchronously, an identification interpretable by the runtime compiler as identifying one or more portions at which the asynchronous function can pause, and an instruction that is structured to be interpretable by the runtime environment as instructing how to return from the asynchronous function.

5. The computing system in accordance with claim 4, the intermediate language representation including a marker that, if interpreted by the runtime compiler, the runtime compiler is caused to determine that the asynchronous function can return asynchronously.

6. The computing system in accordance with claim 4, the intermediate language representation including an instruction that, if interpreted by the runtime compiler, the runtime compiler is caused to make available to the runtime environment of the asynchronous function one or more components that assist the asynchronous function to return asynchronously.

7. The computing system in accordance with claim 6, wherein at least one of the one or more components, if interpreted by the runtime compiler, the runtime compiler identifies where the asynchronous function should be able to pause and enables the asynchronous function to pause.

8. The computing system in accordance with claim 6, at least another of the one or more components, if interpreted by the runtime compiler, enables the runtime environment to return from the asynchronous function.

9. The computing system in accordance with claim 4, the intermediate language presentation including a marker that is structured to be interpretable by the runtime compiler as an instruction to make available one or more components that facilitate the operation of the asynchronous state machine.

10. A method for a runtime compiler within a computing system to compile intermediate code into binary code that is executable by within a runtime environment, the method comprising:
    parse intermediate code that is structured to be interpreted by the runtime compiler of the computing system;
    detect an intermediate language representation of an asynchronous state machine from the parsed intermediate code, the intermediate language representation not being executable native code directly executable within the computing system; and
    in response to the detection, the runtime compiler interpreting the intermediate language representation and generating machine language code that generates an asynchronous state machine within binary code that is executable by a runtime environment, the machine language code directly executable within the computing system;
    wherein the intermediate language representation includes a marker that is structured to be interpretable by the runtime compiler as indicating that the asynchronous function can return asynchronously, an identification interpretable by the runtime compiler as identifying one or more portions at which the asynchronous function can pause, and an instruction that is structured to be interpretable by the runtime environment as instructing how to return from the asynchronous function.

11. The method in accordance with claim 10, the intermediate language representation includes a marker that identifies that the asynchronous function can return asynchronously.

12. The method in accordance with claim 11, the method further for the runtime environment executing the asynchronous function by:

executing a binary representation of the marker within the binary code; and in response to executing the binary representation, making available to the runtime environment a plurality of components that assist in the operation of the asynchronous function.

13. The method in accordance with claim 12, at least one of the one or more components being a pause component that identifies where the asynchronous function can pause, and how to pause.

14. The method in accordance with claim 13, the method further comprising the runtime environment performing the following:

running the pause component to cause the asynchronous function to pause.

15. The method in accordance with claim 14, at least one of the one or more components being a return component that instructs on how to return from the asynchronous function.

16. The method in accordance with claim 15, the method further comprising the runtime environment performing the following:

running the return component to cause the paused asynchronous function to return.

17. The method in accordance with claim 16, the causing of the paused asynchronous function to return comprising constructing a state machine for the asynchronous function, the state machine allowing the asynchronous function to return in a way that the asynchronous function can later resume operation.

* * * * *